(12) United States Patent
Sauber

(10) Patent No.: US 8,250,296 B2
(45) Date of Patent: Aug. 21, 2012

(54) SYSTEM AND METHOD FOR INFORMATION HANDLING SYSTEM MEMORY PAGE MAPPING OPTIMIZATION

(75) Inventor: William F. Sauber, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 1955 days.

(21) Appl. No.: 11/000,821

(22) Filed: Dec. 1, 2004

(65) Prior Publication Data

US 2006/0117162 A1    Jun. 1, 2006

(51) Int. Cl.
 *G06F 12/00* (2006.01)
(52) U.S. Cl. .......................................... 711/105; 711/206
(58) Field of Classification Search .................. 711/105, 711/206
See application file for complete search history.

(56) References Cited

U.S. PATENT DOCUMENTS

| | | | | |
|---|---|---|---|---|
| 4,888,688 A | * | 12/1989 | Hartvigsen et al. | 711/207 |
| 4,972,316 A | * | 11/1990 | Dixon et al. | 711/113 |
| 5,210,875 A | * | 5/1993 | Bealkowski et al. | 713/2 |
| 6,311,221 B1 | * | 10/2001 | Raz et al. | 709/231 |
| 6,427,190 B1 | * | 7/2002 | Hansen | 711/129 |
| 6,457,107 B1 | * | 9/2002 | Wynn et al. | 711/152 |
| 6,496,909 B1 | | 12/2002 | Schimmel | 711/163 |
| 6,604,184 B2 | | 8/2003 | Zahir et al. | 711/207 |
| 6,629,201 B2 | | 9/2003 | Dempsey et al. | 711/113 |
| 6,760,909 B1 | | 7/2004 | Draves et al. | 718/102 |
| 2002/0004882 A1 | * | 1/2002 | Kai et al. | 711/106 |

OTHER PUBLICATIONS

Intel et al., "Advanced Configuration and Power Interface Specification", Revision 1.0b, Feb. 2, 1999, p. 16, 30, 253.*
Michael, Maged M., "Scalable Lock-Free Dynamic Memory Allocation", Proceedings of the ACM SIGPLAN 2004 Conference on Programming Language Design and Implementation, Jun. 2004, ACM, p. 35-46.*

* cited by examiner

*Primary Examiner* — Matthew Bradley
(74) *Attorney, Agent, or Firm* — Hamilton & Terrile, LLP; Robert W. Holland

(57) ABSTRACT

Plural consecutive virtual memory pages associated with an application running on an information handling system are mapped to a physical memory page of the information handling system's physical memory, such as dual channel interleaved memory. Each physical memory page that stores plural consecutive virtual memory pages becomes an effective cache of those virtual memory pages with a RAS operation on the memory, thus providing more efficient memory access in streaming applications. A memory mapping engine associated with the operating system of the information handling system maps plural virtual memory pages to single physical memory pages according to a ratio of physical memory size to virtual memory size provided by a memory manager of the information handling system BIOS, such as with an ACPI message.

19 Claims, 2 Drawing Sheets

SYSTEM AND METHOD FOR INFORMATION HANDLING SYSTEM MEMORY PAGE MAPPING OPTIMIZATION

BACKGROUND OF THE INVENTION

1. Field of the Invention

The present invention relates in general to the field of information handling system memory usage, and more particularly to a system and method for mapping virtual and physical memory pages to optimize memory use.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically perform desired tasks by running applications on top of an operating system, such as WINDOWS, that manages the use of physical components by the application, such as random access memory (RAM) or other memory resources. For instance, applications require some amount of virtual address space to store information during execution of the application. Memory mapping is typically in a CPU hardware map with the operating system setting up the mapping of virtual memory to physical memory and dynamically loading a portion of the mapping into the hardware map. The operating system typically allocates some amount of physical memory to be mapped from the application's virtual address space. The operating system performs this allocation to a granularity referred to as virtual memory pages. To varying extents, applications will exhibit spatial locality of reference within these virtual memory pages and specifically within consecutive virtual memory pages by using the virtual memory pages in sequential order. Physical memory system terminology also uses the term "page" to describe information storage. In physical system memory a page refers to the amount of data pulled from storage arrays on a single row address strobe (RAS) operation. This physical memory page may include multiple devices and multiple standard 64 bit interfaces, such as JDEC's PC2100 standard interfaces. Information in a physical memory page is available for repeated accesses with column address strobe (CAS) cycles. A physical memory page acts as a cache for future accesses and spatial locality of reference within physical memory pages is of value for more rapid information retrievals. Over time as applications or portions of applications are loaded and removed from physical memory, allocation of virtual pages to physical memory pages becomes random in that the probability that consecutive virtual pages map to a signal physical page is only related to the number of physical pages available.

In the past, information handling systems typically had virtual memory pages that were larger or equal to physical memory pages so that one or more physical memory pages are used to store a single virtual memory page. If virtual memory pages use one or more physical memory pages, the virtual memory page is effectively cached in the physical memory pages. However, storage capacity and speed of physical memory systems has steadily improved over the past several years with more dense devices that read greater amounts of information with each row address strobe. For instance, some dual channel interleaved memory systems have 128 bit wide access with one access strobe reading a double wide amount of stored information. As a result of the improvements to physical memory page size, physical memory pages are larger than virtual memory pages with increasing frequency in information handling systems having up-to-date physical memory systems. When physical memory pages are larger than a virtual memory page, the probability is significantly reduced that the available information in a physical memory page in excess of the size of a virtual memory page will act as an effective cache. In other words, a strobe of a physical memory page will recall the virtual memory page plus additional information stored in the physical memory page. In applications that rely on rapid memory accesses, such as streaming applications, inefficiencies are introduced with a physical memory page having multiple non-consecutive virtual memory pages since the probability that all of the information retrieved will be usable is very low.

SUMMARY OF THE INVENTION

Therefore a need has arisen for a system and method which maps consecutive virtual memory pages to a single physical memory page.

In accordance with the present invention, a system and method are provided which substantially reduce the disadvantages and problems associated with previous methods and systems for mapping virtual and physical memory. Plural consecutive virtual memory pages of an application are mapped to a physical memory page of an information handling system for more efficient retrieval of information stored in the virtual memory pages from the physical memory.

More specifically, an information handling system has a processor, memory and BIOS having their operation coordinated by an operating system to support the running of one or more applications. The operating system includes a memory mapping engine to map virtual memory pages of the application to physical memory locations. A memory manager associated with the BIOS detects the size of physical memory and communicates the size to the operating system memory mapping engine, such as with an Advanced Configuration and Power Interface (ACPI message. If the physical memory pages are larger than virtual memory pages, the memory mapping engine determines the ratio of physical memory page size to virtual memory page size, maps plural consecutive virtual memory pages to a single physical memory page and tracks the location of virtual memory pages in physical memory with a memory map. When the application retrieves the plural virtual memory pages from the physical memory, a single retrieval operation, such as a single RAS operation, will retrieve the virtual pages in order for use by the application. With streaming applications or other applications that make repeated use of information stored in consecutive virtual pages, the mapping of plural consecutive virtual memory pages to single physical memory pages improves information retrieval speed by effectively caching information to physical memory rows.

The present invention provides a number of important technical advantages. One example of an important technical advantage is that an application retrieves multiple consecutive virtual memory pages with each physical memory page that is retrieved. Each physical memory page having consecutive virtual memory pages effectively becomes a cache of those virtual memory pages that is accessible with CAS operations once a RAS operation is performed. Applications thus run more quickly and efficiently, especially applications that rely on rapidly repeated memory accesses, such as streaming applications.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An application running on an information handling system more effectively retrieves information from physical memory of the information handling system by having plural consecutive virtual memory pages of the application mapped to a single physical memory page. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
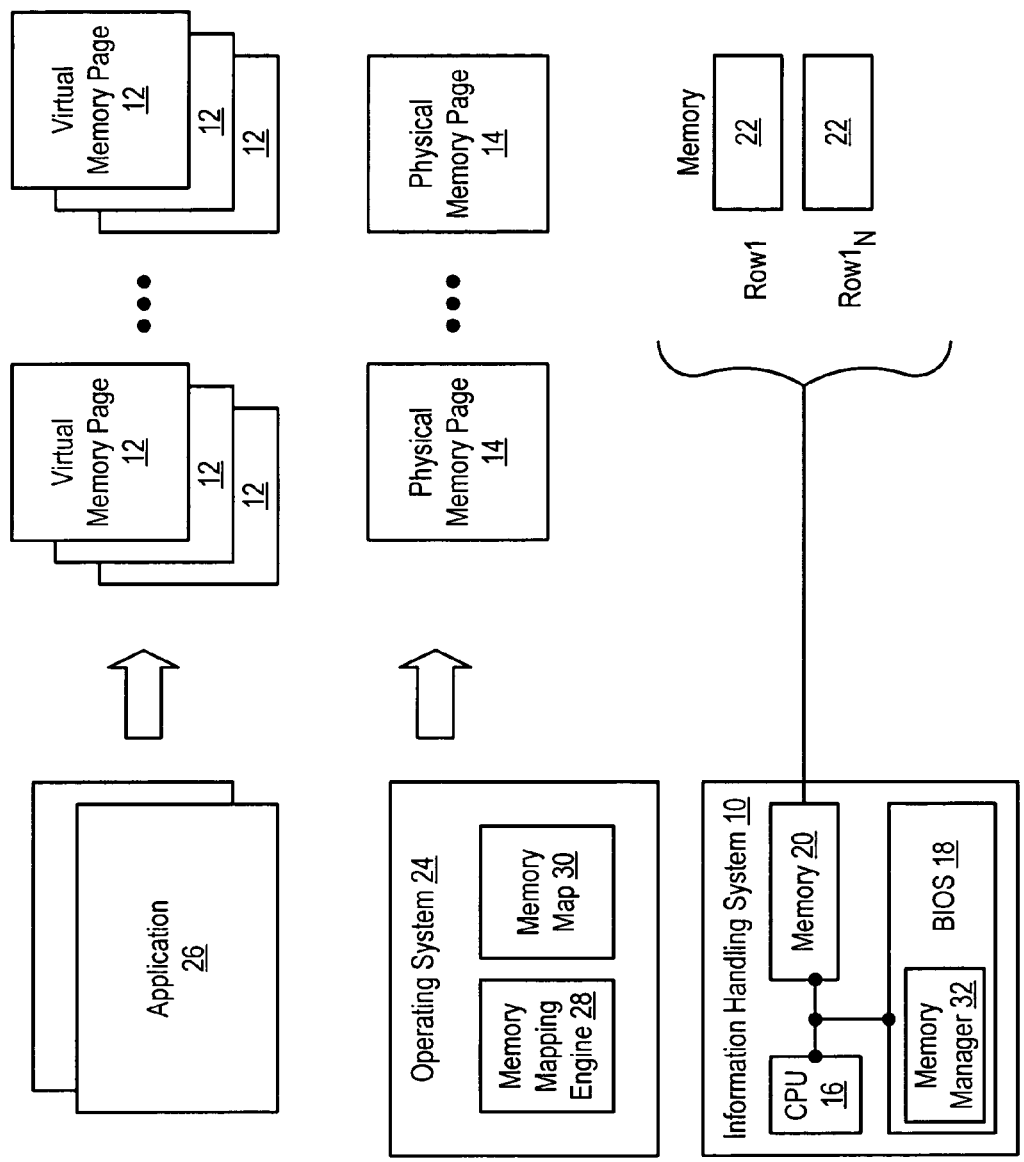
FIG. 1 depicts a block diagram of an information handling system configured to map plural consecutive virtual memory pages to single physical memory pages.

Referring now to FIG. 1, a block diagram depicts an information handling system 10 configured to map plural consecutive virtual memory pages 12 to single physical memory pages 14. Information handling system 10 has a CPU 16 that processes information, a BIOS 18 that manages the operation of physical components of information handling system 10, and memory 20 that stores information, such as dual channel interleaved random access memory that organizes information by columns and rows. Memory 20 retrieves information by performing a RAS operation to identify a row (page) 22 followed by a CAS operation to identify a columns within the row. Each row 22 stores a physical memory page 14. A typical physical memory page of a dual channel interleaved memory device has a size of approximately 8 Kbytes for multiple devices forming a memory interface. An operating system 24, such as WINDOWS, runs on CPU 16 and coordinates the use of physical resources by applications 26 that perform desired tasks. Operating system 24 coordinates application use of physical memory 20 resources by assigning applications virtual memory pages 12 to store information. A memory mapping engine 28 maps virtual memory pages to physical memory and tracks the relationship between virtual and physical memory in a memory map 30. A typical virtual memory page has a size of 4 KBytes. Note that operating system 24 is itself an application in the sense that operating system 24 runs with its own assignment of virtual memory to itself.

In order to improve accesses to memory 20 by applications 26, memory mapping engine 28 maps plural consecutive virtual memory pages 12 to single physical memory pages 14. A memory manager 32 associated with BIOS 18 determines the size of physical memory pages 14 and communicates the physical memory page size to memory mapping engine 28, such as with an ACPI message. Memory mapping engine 28 determines a ratio of the physical memory page 14 size over the virtual memory page 12 size, where the page sizes are powers of 2, to determine the number of virtual memory pages 12 to map to each physical memory page 14. For instance, where the physical memory page size is 8 KBytes and the virtual memory page size is 4 KBytes, two virtual memory pages are mapped to each physical memory page. If the memory modules of an information handling system have different size physical memory pages, the ratio is computed using the minimum physical memory page size. Memory manager 32 allows user override of the use of optimized virtual to physical memory page mapping, such as in the event that the more random distribution of virtual pages provides better performance due to interaction of the application with memory controller design.

Figure 2:
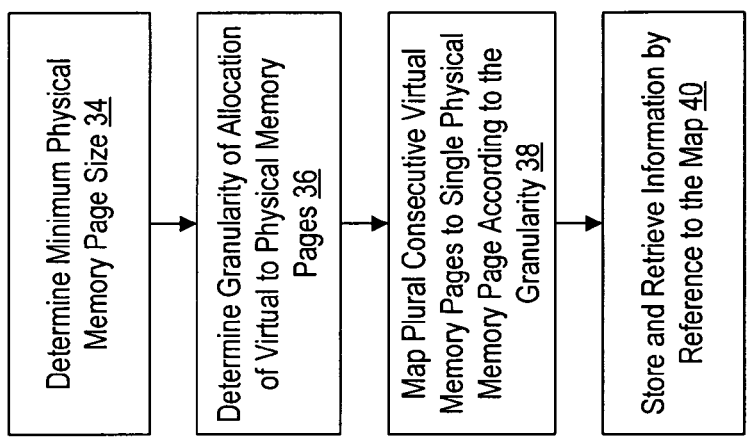
FIG. 2 depicts a process for mapping plural virtual memory pages to a single physical memory page.

Referring now to FIG. 2, a flow diagram depicts a process for mapping plural virtual memory pages to single physical memory pages. The process begins at step 34 with a determination of the minimum physical memory page size for the memory of the information handling system. Since physical memory page size is not necessarily the same across an information handling system, the use of the minimum size ensures that the same number of virtual memory pages will fit in each physical memory page. At step 36, the granularity of allocation of virtual to physical memory pages is determined based on the minimum physical memory page size and the virtual memory page size, where both the physical and virtual memory page sizes are powers of two. At step 38, plural consecutive virtual memory pages are mapped to single physical memory pages according to the determined granularity. The virtual memory pages are mapped in consecutive order into available physical memory pages so that retrieval of the physical memory page results in simultaneous retrieval of related virtual memory pages. This is repeated for each application that is loaded. Efficient retrieval of information is aided by having a single physical memory page operation retrieve plural consecutive virtual memory pages for use by the application instead of requiring a physical memory page retrieval for each virtual memory page. At step 40, information is stored to physical memory and retrieved from physical memory for use by an application by reference to the memory map.

Although the present invention has been described in detail, it should be understood that various changes, substitutions and alterations can be made hereto without departing from the spirit and scope of the invention as defined by the appended claims.

What is claimed is:

1. An information handling system comprising:
   a processor operable to run an application under direction of an operating system;
   a memory interfaced with the processor and operable to retrieve information in response to column and row address strobes, the information associated with a row address strobe forming a physical memory page;
   an application running on the processor by retrieving information from virtual memory pages in a predetermined order; and
   an operating system running on the processor, the operating system operable to map plural consecutively ordered virtual memory pages of the application to a single physical memory page.

2. The information handling system of claim 1 wherein the number of virtual memory pages mapped to a physical memory page is the ratio of physical memory page size over virtual memory page size.

3. The information handling system of claim 1 wherein the memory comprises dual channel interleaved random access memory.

4. The system of claim 1 wherein the application comprises a streaming application.

5. The system of claim 1 further comprising a BIOS interfaced with the processor, memory and operating system, the BIOS having a memory manager operable to determine the minimum physical memory page size of the memory and to communicate the minimum physical memory page size to the operating system for mapping virtual memory pages to a physical memory page.

6. The system of claim 5 wherein the memory manager provides physical memory page size as an Advanced Configuration and Power Interface (ACPI) message.

7. The system of claim 5 wherein the memory manager is further operable to override operating system mapping of virtual memory pages to physical memory pages.

8. A method for storing information, the method comprising:
   running an application on an information handling system having a memory, the memory having plural physical memory pages;
   defining virtual memory pages associated with the application;
   mapping plural consecutive virtual memory pages to a physical memory page; and
   storing information from the application to the virtual memory pages and mapping plural consecutive virtual memory pages to plural physical memory pages, each physical memory page storing plural consecutive virtual memory pages.

9. A method for storing information, the method comprising:
   running an application on an information handling system having a memory, the memory having plural physical memory pages;
   defining virtual memory pages associated with the application;
   mapping plural consecutive virtual memory pages to a physical memory page;
   storing information from the application to the virtual memory pages; and
   retrieving information from the plural consecutive virtual memory pages by retrieving the physical memory page.

10. The method of claim 9 wherein the application comprises a streaming application.

11. A method for storing information, the method comprising:
    running an application on an information handling system having a memory, the memory having plural physical memory pages;
    defining virtual memory pages associated with the application;
    mapping plural consecutive virtual memory pages to a physical memory page;
    storing information from the application to the virtual memory pages;
    determining the minimum physical memory page size of the information handling system;
    determining a physical to virtual memory size ratio by dividing the minimum physical memory page size by the virtual memory page size; and
    mapping the virtual memory pages to the physical memory page according to the ratio.

12. The method of claim 11 further comprising communicating the minimum physical memory page size in the information handling system with an ACPI message.

13. A method for storing information, the method comprising:
    running an application on an information handling system having a memory, the memory having plural physical memory pages;
    defining virtual memory pages associated with the application;
    mapping plural consecutive virtual memory pages to a physical memory page;
    storing information from the application to the virtual memory pages; and
    selectively disabling the mapping.

14. A method for storing information, the method comprising:
    running an application on an information handling system having a memory, the memory having plural physical memory pages;
    defining virtual memory pages associated with the application;
    mapping plural consecutive virtual memory pages to a physical memory page; and
    storing information from the application to the virtual memory pages;
    wherein the information handling system memory comprises a dual channel interleaved memory.

15. A system for storing information associated with an application running on an information handling system, the application having virtual memory pages, at least some of the virtual memory pages having a consecutive order, the information handling system having physical memory, the physical memory having physical memory pages, the system comprising:
    a memory manager operable to determine a ratio of physical memory page size to virtual memory page size;
    a memory mapping engine operable to apply the ratio to store plural consecutive virtual memory pages in a physical memory page; and
    a memory map tracking the association of the virtual memory pages with the physical memory page.

16. The system of claim 15 wherein an operating system manages operation of the application on the information handling system, and wherein the memory mapping engine and memory map are operating system components.

17. The system of claim 16 wherein a BIOS manages information handling system hardware components including memory, and wherein the memory manager is a BIOS component.

18. The system of claim 17 wherein the memory manager communicates the ratio to the memory mapping engine with an ACPI message.

19. The system of claim 17 wherein the memory manager is further operable to override the mapping of plural consecutive virtual memory pages to the physical memory page.

* * * * *